3,121,737
SULFONIC ACID FORMATION VIA SULFONATION OF TRIALKYL AND TRIARYLALKYL ALUMINUM

Alfred J. Rutkowski, Colonia, and Albin F. Turbak, New Providence, N.J., assignors to Esso Research and Engineering Company, a corporation of Delaware
No Drawing. Filed Dec. 24, 1959, Ser. No. 861,744
7 Claims. (Cl. 260—513)

This invention relates to a novel process for preparing sulfonic acids by reacting organometallic compounds with sulfur trioxide. In particular this invention relates to the production of acids having the general formula $$R-SO_3H$$

wherein R is a $C_2$–$C_{30}$ hydrocarbon radical which may be alkyl, aryl, cycloalkyl, arylalkyl or alkylaryl hydrocarbon radical. More particularly this invention relates to the production of these acids by reacting an organometallic compound wherein the metallic constituent is a metal selected from the metals of groups I, II and III of the periodic table, the metals of the first transition series of the periodic table, i.e. metals having an atomic number of 21 to 29 inclusive, silicon, germanium, tin and lead with a stoichiometric amount of $SO_3$. The process is also applicable to the production of acids having the formula above set forth wherein R is a $C_2$–$C_{30}$ substituted hydrocarbon radical wherein one or more hydrogen atoms of such radical are replaced with a halogen atom or an alkoxy radical, e.g.

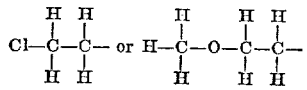

Still more particularly, this invention relates to a process for producing sulfonic acids as aforedescribed by reacting an organometallic compound with an $SO_3$-organic complex which partially reduces the activity of $SO_3$ at temperatures in the range of −100° to +100° C., preferably between 20° and 50° C.

In the past, attempts to react organometallic compounds with $SO_3$ have resulted in the formation of unidentifiable, tar-like products. It has now been discovered that good yields of sulfonic acids, which can be recovered as pure compounds, can be prepared by reacting an organometallic compound with an $SO_3$-organic complex which partially reduces the activity of $SO_3$. Such complexes can be prepared by admixing $SO_3$ with an organic compound selected from the group consisting of acyclic ethers, e.g. dibutyl ether, bis (beta chloroethyl ether) and any dialkyl ethers of poly alkyl oxide structures such as dibutyl carbitol; cyclic ethers, e.g. tetrahydropyran, dioxane and tetrahydrofuran; tertiary nitrogen containing compounds, e.g. trimethyl amine, dimethyl aniline and N,N′dimethyl formamide, nitrogen containing heterocyclic compounds, e.g. pyridine, picoline, lutidine and compounds which contain both phosphorus and oxygen. The phosphorus-oxygen complexing agents are hereinafter discussed in greater detail. Thus, for example, $SO_3$ is combined with a phosphorus-oxygen containing compound in an approximately 1:1 to 3:1 mole ratio as desired, whereas the limits of combination with dioxane are within the mole ratio of 1:1 to 2:1. With compounds such as pyridine the complex with $SO_3$ is an equi-molar complex.

It will be noted that in the aforementioned complexes the ratio of $SO_3$ to the completed complex can be made to vary. Thus, by decreasing the proportion of $SO_3$ in the complex, the activity of the complex is likewise decreased. Since the reactivity of the various organometallic compounds will vary according to type and structure, an $SO_3$ complex of the types aforementioned can be chosen in each instance which is sufficiently active to effect the desired reaction at a convenient temperature and at the same time one in which the activity of the $SO_3$ is sufficiently diminished to enable the reaction to proceed smoothly while yielding pure products. Thus, for example, with a reactive organometallic such as aluminum alkyls, the $(RO)_3PO/SO_3$ complex has sufficiently active $SO_3$ for producing the desired sulfonic acids while for a relatively inactive metal alkyl a complex such as $(RO)_3PO/2SO_3$, $(RO)_3PO/3SO_3$, or dioxane/$2SO_3$ containing more reactive $SO_3$ is necessary for the reaction. The varying reactivities of organometallics and $SO_3$ complexes are relative and do not limit the scope of the invention but merely serve to illustrate the versatility of the invention.

This control feature when applied to the reaction of $SO_3$ with organometallic compound provides a means of selective sulfonation wherein the $SO_3$ group is bonded to a carbon atom which prior to the reaction was bonded to the metal constituent of the organometallic reactant. Thus, where the hydrocarbon radical attached to the metal constituent is an arylalkyl radical, sulfonation at the end of the alkyl chain can be effected without sulfonating the aryl portion.

The metal atoms of the organometallic reactant may be either monovalent or multivalent. The organic component of such compounds consists of one or more $C_2$ to $C_{30}$ hydrocarbon radicals which may be alkyl, aryl, cycloalkyl, arylalkyl or alkylaryl. The alkyl portions of these radicals may be either straight or branched chain groups. The invention is not limited to the use of organometallic compounds wherein the hydrocarbon radicals attached to the metal constituent are of equal length or carbon number but may include radicals of varying size such as those obtained from growth type reactions. The number of organic radicals in each organometallic compound will, of course, be limited by the maximum valence of the metal constituent. The number of sulfonic acid molecules which can be prepared from a given organometallic molecule is in turn dependent upon the number of such radicals. Although the process of this invention is not limited to organometallic compounds wherein each valence is satisfied by a hydrocarbon radical, organometallic compounds of this type are preferred. Those organometallic compounds containing at least one hydrocarbon radical but wherein one or more valances are satisfied with other radicals or atoms such as hydrogen, halogen or alkoxy radicals and those wherein one or more valences are satisfied by a substituted hydrocarbon radical may also be used.

The term "substituted hydrocarbon radical" is here limited to those radicals wherein one or more hydrogen atoms on such radical are replaced by a halogen atom or an alkoxy radical. It is, of course, understood that the reaction of $SO_3$ with an organometallic compound having a valence satisfied by an alkoxy radical, e.g.

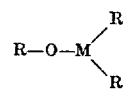

wherein M is a metal, O is oxygen and R is a hydrocarbon radical, will result in the production of an organic sulfate, e.g. ethyl sulfuric acid, so far as the alkoxy radical is concerned.

The reactants may be contacted with each other at a temperature in the range of −100° to +100° C. at pressures ranging from 0.5 up to 20 atmospheres or more for from 1 second to 1 hour. However, the reaction is preferably carried out at a temperature in the range of −10° to +40° C. under atmospheric pressure.

The reaction may be carried out employing only the reactants or with the aid of a diluent which will dilute the reaction mixture and thus serve as an additional control upon the activity of the $SO_3$. Diluents are preferred which maintain a single phase reaction mixture. Suitable diluents for use with this invention include halogen substituted hydrocarbons such as chlorobenzene, 1,2-dichloroethane, carbontetrachloride, chloroform, propylene dichloride, butyl chloride, butyl bromide, bromobenzene, 1,2,dibromoethane, carbon tetrabromide, tetrafluoroethane, difluorodichloroethane, difluorodichloromethane, tetrafluorodichloroethane, and gaseous diluents such as nitrogen and the gases of group VIII of the periodic table. The specific periodic table referred to is the 1959 revised edition of the table designed in 1924 by Henry D. Hubbard, revised by William F. Meggers and published by W. M. Welch Manufacturing Company, of Chicago, Illinois. If dioxane, pyridine, or N,N'dimethyl formamide is employed as the complexing agent with $SO_3$, an excess of such compound may be employed as a diluent. Liquid and gaseous hydrocarbons such as benzene, toluene, and $C_1$ to $C_{10}$ hydrocarbons of the paraffin series may also be used. However, the halogenated hydrocarbon diluents are preferred. Of these the chlorinated hydrocarbons and particularly dichloroethane are most preferred. Thus, the sulfonating complex may be admixed with or dissolved in an inert diluent, e.g. 0.5 to 95 wt. percent solution, prior to admixing it with the organometallic compound dissolved in the same or a different but compatible diluent. While the organometallic compound solution may contain as little as 1 wt. percent of organometallic compound, solutions containing as much as 95 wt. percent may also be used. However, the concentration of organometallic compound in the diluent will depend to a large extent on its solubility, and in some instances it may be desirable not to use a diluent. Since the sulfonating reaction is exothermic a cooling jacket or recycle means should be employed especially where little or no diluent is present in the reaction zone to dissipate the heat of reaction. The acid produced by the sulfonation may be neutralized with an aqueous solution of an alkali or alkaline earth metal hydroxide, e.g. a 40–50 wt. percent solution of sodium hydroxide, and the metal salt thus produced may be dried either by heating it or mixing it with a dehydrating agent, such as anhydrous sodium sulfate. Any excess caustic and salts may be removed by extracting the reaction product with an alcohol, such as isopropanol.

The complexes employed in this invention are preferably prepared separately and admixed with the organometallic reactant.

The complexes employed in this invention may be prepared at conditions such as those hereinbefore set forth for reacting the complex with the organometallic compound, i.e. between −100° to +100° C., at pressures ranging from 0.5 up to 20 atmospheres or more for from 1 second to 1 hour or more. When the reactants are admixed with adequate agitation, such as that obtained with an efficient stirrer, the reaction is almost instantaneous and therefore the time is principally dependent upon the rate of addition of the sulfur trioxide substance to the phosphorus-oxygen containing compound. Because the reaction is accompanied by a rise in temperature in the reaction zone, it may be desirable in some instances to employ either an internal cooling system, e.g. recycling, or an external coolant in a jacket. The amount of diluent employed to assist in the dissipation of heat will depend to a large extent on the reaction temperature. For instance at very low temperatures the inert diluent may contain up to 95 wt. percent of reactants while at temperatures approximately that of the room, e.g., 20°–25° C., the solvent may contain as little as 0.1 wt. percent reactants.

In the preparation of the $SO_3$ complexes with phosphorus and oxygen containing organic compounds the phosphorus may be either trivalent or pentavalent. Various organic phosphite, phosphinite, phosphinate, phosphate, phosphonate, phosphonite, pyrophosphate and metaphosphate compounds may be employed to prepare the complexed product. The compounds may contain from 0 to 3 ester oxygens in the case of the pentavalent phosphorus compounds and 1 to 3 ester oxygens in the case of the trivalent phosphorus compounds. These compounds may, of course, contain oxygen other than the aforesaid ester oxygens. The ester oxygens may have alkyl, aryl, alkylaryl or arylalkyl groups attached to them containing 1 to 18 carbon atoms. Similar organic groups may be attached to the phosphorus directly. These organic groups should be relatively nonreactive, especially with the sulfur trioxide used to form the complex. If a reaction does occur between the sulfur trioxide and the organic group attached to the phosphorus, it will be necessary to use additional sulfur trioxide to compensate for this loss.

Among the organic phosphorus and oxygen containing compounds which may be employed to produce the complexes of the present invention are the following: triethyl phosphate, trimethyl phosphate, tripropyl phosphate, tributyl phosphate, triethyl phosphite, trimethyl phosphite, tripropyl phosphite, tri-butyl phosphite, diethyl hydrogen phosphate, dimethyl hydrogen phosphate, diethyl hydrogen phosphite, dimethyl hydrogen phosphite, ethyl dihydrogen phosphate, methyl dihydrogen phosphate, ethyl dihydrogen phosphite, methyl dihydrogen phosphite, tris (2,4-dichlorophenyl) phosphate, tris (2,4-dichlorophenyl) phosphite, bis (2,4-dichlorophenyl) hydrogen phosphate, bis (2,4-dichlorophenyl) hydrogen phosphite, tris (p-nitrophenyl) hydrogen phosphate, bis (p-nitrophenyl) hydrogen phosphite, tris (p-sulfophenyl) phosphate, tris (p-sulfophenyl) phosphite, 2,4-dichlorophenyl dihydrogen phosphate, 2,4-dichlorophenyl dihydrogen phosphite, tetraethyl pyrophosphate, tetramethyl pyrophosphate, dimethyl diethyl pyrophosphate, ethyl metaphosphate, bis (2,4-dichlorophenyl) diethyl pyrophosphate, sym-p-nitrophenyl pyrophosphate, p-nitrophenyl metaphosphate, tris (B-chloroethyl) phosphate, tetra (B-chloroethyl) pyrophosphate, diethyl dihydrogen pyrophosphate, di (2,4-dichlorophenyl) dihydrogen pyrophosphate, tris (2,4,6-trimethylphenyl) phosphate, tris (3,4,6-trimethylbenzyl) phosphate, trilauryl phosphate and tristearyl phosphate.

The complexes with pyridine, N,N'dimethyl formamide, dioxane, etc. may be prepared in the same manner as those prepared from phosphorus compounds.

Sulfonic acids which may be prepared by this process include, by way of example, ethyl sulfonic acid, n-butyl sulfonic acid, iso-butyl sulfonic acid, octyl sulfonic acid, iso-octyl sulfonic acid, decyl sulfonic acid, dodecyl sulfonic acid, tetradecyl sulfonic acid, octadecyl sulfonic acid, eicosyl sulfonic acid, cyclopropyl sulfonic acid, cyclopentyl sulfonic acid, cyclohexyl sulfonic acid, cyclododecyl sulfonic acid, 4-methyl cyclohexyl sufonic acid, 3-butyl cyclohexyl sulfonic acid; phenyl sulfonic acid; alkylaryl sulfonic acids such as 2-butyl phenyl sulfonic acid, 4-nonyl phenyl sulfonic acid, 4-dodecyl phenyl sulfonic acid, 4-tetradecyl phenyl sulfonic acid, 4-hexadecyl phenyl sulfonic acid, 4-octadecyl phenyl sulfonic acid; arylalkyl sulfonic acids such as phenyl methyl sulfonic acid, 2-phenyl ethyl sulfonic acid, 3-phenyl butyl sulfonic acid, 9-phenyl nonyl sulfonic acid, 12-phenyl dodecyl sulfonic acid, 14-phenyl tetradecyl sulfonic acid, 16-phenyl hexadecyl sulfonic acid, 18-phenyl octadecyl sulfonic acid, alpha naphthyl sulfonic acid, beta naphthyl sulfonic acid, and substituted arylalkyl sulfonic acids such as chloro phenyl alkyl sulfonic acids, e.g. 2-o-chlorophenyl ethane sulfonic acid, bromo phenyl alkyl sulfonic acids, e.g. 2-o-bromophenyl ethane sulfonic acid, fluoro phenyl alkyl sulfonic acids, and methoxyl phenyl alkyl sulfonic acids, e.g. 2-p-methoxy phenyl ethyl sulfonic acid.

In addition to the foregoing mono-sulfonic acids, alkyl, aryl, cycloalkyl, arylalkyl or alkylaryl disulfonic acids can be prepared from dimetal alkyl and dimetal aryl compounds which, by way of example, may be described by the following formulae:

FORMULA A

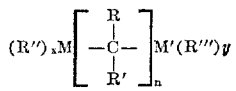

wherein R, R', R", and R'" may be hydrogen, $C_1$ to $C_{10}$ alkyl, aryl, cycloalkyl, arylalkyl or alkylaryl groups and may be the same or different; M and M' are metals (either the same or different) selected from the metals in groups I, II and III of the periodic table, the metals of the first transition series of the periodic table, i.e. metals having an atomic number of 21 to 29 inclusive, silicon, germanium, tin and lead; $n$ is a positive integer in the range of 2 to 10; $x$ is one less than the valence of M where R" is a monovalent radical and two less than the valence of M where R" is divalent; and $y$ is one less than the valence of M' where R'" is a monovalent radical and two less than the valence of M' where R'" is divalent. Where M or M' are metals from group I, then the corresponding $(R'')_x$ or $(R''')_y$ equals zero.

FORMULA B $(R'')_xM$—Ar—$M'(R''')_y$ wherein Ar is a phenylene radical or a divalent polynuclear aromatic radical and M and $M'(R'')_x$ and $(R''')_y$ have values as defined above.

Unsaturated sulfonic acids can also be made in accordance with the present invention from organometallic compounds having the general formula:

FORMULA C

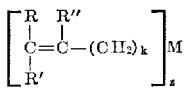

wherein $k$ is equal to 0 or a positive integer in the range of 1 to 10; R, R' and R" are selected from hydrogen, $C_1$ to $C_{10}$ alkyl, aryl, cycloalkyl, arylalkyl or alkylaryl groups; M is a metal as defined in Formula A and $z$ is equal to the valence of M.

A few of the compounds represented by the foregoing general formulas are as follows:

*Examples of Formula A Compounds*

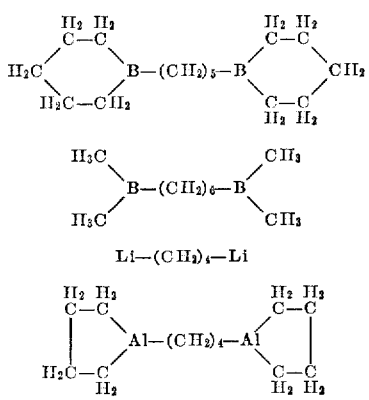

*Examples of Compounds of Formula B*

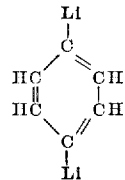

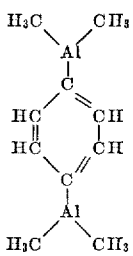

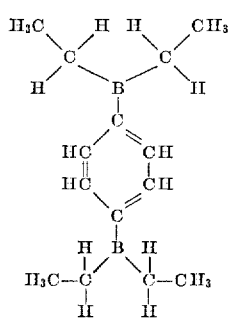

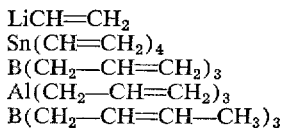

*Examples of Compounds of Formula C*

LiCH=CH$_2$
Sn(CH=CH$_2$)$_4$
B(CH$_2$—CH=CH$_2$)$_3$
Al(CH$_2$—CH=CH$_2$)$_3$
B(CH$_2$—CH=CH—CH$_3$)$_3$

The organometallic compound suitable for use in this invention may be prepared according to conventional methods such as reaction of Grignard reagents with metal halides, metal hydrides with olefins, and the like, or from growth type reactions such as those discussed in "Kinetics of Ethylene Polymerization With Aluminum Alkyls," International Symposium on Macromolecular Chemistry, Milan, Italy, Septmeber 26 to October 2, 1954. More specifically, one method for preparing organometallic compounds suitable for use with this invention is disclosed in Ziegler et al., U.S. Patent 2,781,410. In this process ethylene and aluminum alkyl such as aluminum triethyl unite to form higher alkyls of aluminum. The preparation of aluminum triethyl from aluminum hydride and ethylene is also described in this patent. The preparation of trisubstituted boranes of the type R$_3$B wherein R is a hydrocarbon radical which can be aliphatic, alicyclic or aromatic is described in British Patent 804,341.

Sulfonic acids have various uses. These include by way of example, catalysts for esterification, antistatic agents for fibers and fabrics when combined with high molecular weight amines, dyeing aids and for use in detergent manufacture. The alkyl aryl sulfonic acids prepared by this invention having 3 to 24, preferably 11 to 18, carbon atoms in the alkyl chain are particularly valuable for use in detergent manufacture. For example, the sodium salts of such acids have good detergent properties. This sulfonate detergent in commercial practice may, of course, be combined with various detergent builders such as sodium sulfate, carboxy methyl cellulose, various sodium phosphates and the like.

The following examples are given to more fully illustrate how the present invention may be carried out.

EXAMPLE 1

Into a 500 ml. 4-neck flask fitted with a 250 ml. dropping funnel, cold heptane condenser, thermowell and air driven stirrer was placed 5 grams (0.0136 mole) of trioctylaluminum diluted with 250 ml. of 1,2-dichloroethane. The dichloroethane was dried prior to use, and the apparatus was heated with dry nitrogen passing through prior to use. Into the drapping funnel was placed 7.5 grams (0.041 mole) of triethyl phosphate diluted with 99 ml. of 1,2-dichloroethane and 3.3 grams (0.041 mole) of liquid $SO_3$. This complex of triethyl phosphate and $SO_3$ was added over 77 minutes, and was accompanied by a rise in temperature from 25° C. to 28.2° C. The reaction mixture was then heated to 30°–33° C. for 2 hours. When the reaction mixture cooled to room temperature 4 cc. of conc. HCl diluted to 10 ml. with water was added slowly with a temperature rise from 25° to 27° C. The reaction mixture was washed with 70 ml. of water and 150 ml. of ethyl ether. The ether layer was dried over $K_2CO_3$ and the ether and dichloroethane were removed. The residue on distillation gave 6.1 grams triethyl phosphate, B.P. 75–78° C./3.0–3.8 mm.

The water layer after concentration to 40 ml. was neutralized with aqueous sodium hydroxide during which time a solid settled out. The liquor was diluted with water to 50 ml. and 50 ml. of isopropyl alcohol was added. This solution was heated to about 50° C. and saturated with $Na_2CO_3$. The upper alcohol layer was separated and the alcohol evaporated. There was obtained 5.3 grams of solid product, a 66 mole percent yield. Analysis of the solid gave 10.2% Na, 13.10% S, as compared with 10.6% Na, and 14.8% S, calculated for sodium octyl sulfonate.

EXAMPLE 2

Into a 1 liter 4-neck flask with a cold heptane condenser, 500 ml. dropping funnel, thermowell and stirrer was placed 31.5 grams (0.058 mole) tridodecylaluminum in 250 ml. of 1,2-dichloroethane. The dichloroethane was previously dried and the apparatus was heated with dry $N_2$ passing through. Into the dropping funnel was placed 27.0 grams (0.147 mole) triethyl phosphate in 150 ml. dichloroethane and 14.5 grams (0.18 mole) $SO_3$ in 50 ml. dichloroethane. The temperature was maintained between 30°–35° C. by regulating the rate of addition. After complete addition the reaction mixture was heated at 64° C. for 45 minutes. Then, 300 ml. of water was added and a large amount of solid appeared. On neutralization a voluminous amount of solid appeared. The solid was acidified to a slightly acidic stage by adding dilute HCl and the free sulfonic acid was taken up in petroleum ether. After evaporation of the petroleum ether the free acid was converted to the sodium salt with aqueous NaOH. The sodium salt was washed with diethyl ether and a white solid product, sodium dodecyl sulfonate was obtained. Analysis of the solid gave 8.52% Na and 11.34% S, as compared with 8.46% Na and 11.75% S, calculated for sodium dodecyl sulfonate. The yield obtained was 45 mole percent.

EXAMPLE 3

Into a 1 liter four-neck flask equipped with a 150 ml. dropping funnel, cold heptane condenser, thermowell, and stirrer was placed 34.3 grams (0.1 mole) of tri-styryl aluminum diluted to 200 ml. with 1,2-dichloroethane. Into the dropping funnel was placed 78.6 grams (0.3 mole) of a 1/1 complex of triethylphosphate and $SO_3$ diluted to 130 ml. with dichloroethane. The complex was added to the aluminum styryl over a 1 hour period. The temperature was kept between 30°–45° C. by regulating the addition. After complete addition of the complex the flask was heated to 60° C. for 45 minutes, and allowed to stand overnight. To the reaction mixture was added 100 ml. of distilled water with stirring. After 25 ml. was added, a solid came out of solution which dissolved with additional water. Two layers separated, the upper layer was extracted with petroleum ether. The lower layer was put on a steam bath and the dichloroethane removed. The residue of the upper layer after removal of the petroleum ether was neutralized with aqueous sodium hydroxide. A large amount of solid appeared. The solid was extracted with a 50/50 isopropyl alcohol-water mixture. The water layer was salted out with potassium carbonate, and the layer which formed was separated after heating the alcohol-water solution to 50° C. The isopropyl alcohol solution was separated and the alcohol was evaporated. The original lower layer after removing the dichloroethane was neutralized with aqueous NaOH and a solid, sodium 2 phenyl ethyl sulfonate, was obtained in the amount of 39.6 grams (71% yield).

EXAMPLE 4

Into a 500 ml. four-neck flask, fitted with a cold heptane condenser, stirrer, thermowell, and a 125 ml. dropping funnel was placed 38.9 grams (0.05 mole) of trioctadecylborane diluted with 300 ml. of dichloroethane. Into the dropping funnel was placed 39.5 grams (0.15 mole) of triethyl phosphate/$SO_3$ complex diluted to 50 ml. with dichloroethane. The $SO_3$ complex was added to the boron alkyl with stirring and reaction temperature was kept at 25° C. with cooling. Total addition time was 1 hour. The reaction mixture was stirred for an additional hour. The reaction mixture was a clear yellow color and exhibited some foaming tendency. The reaction mixture was neutralized with aqueous NaOH and 100 ml. of isopropyl alcohol-water (50/50) was added. The reaction mixture was washed with two portions (100 ml.) of petroleum ether and formed two distinct layers. The lower aqueous layer was salted out with $K_2CO_3$ and the alcohol layer was removed. After removal of the alcohol and the petroleum ether from the respective layers 33.5 grams of sodium octadecyl sulfonate were obtained.

EXAMPLE 5

Into a 500 ml. four-neck flask equipped as in Example 4 is placed 40.3 grams (0.1 mole) of tetraisoamyl tin diluted with 100 ml. of dichloroethane. Into the dropping funnel is placed 68.4 grams (0.2 mole) of a complex made up of 1 equivalent of triethyl phosphate to two equivalents of $SO_3$ diluted with 100 ml. of dichloroethane. The reaction is carried out in accordance with Example 4. From the reaction sodium isoamyl sulfonate is obtained.

EXAMPLE 6

A sulfonic acid is produced as in Example 4 except for the following differences: Dicyclohexyl berryllium, 17.5 grams (0.1 mole) diluted to 100 ml. with carbon tetrachloride, is reacted with 52.4 grams (0.2 mole) of a 1:1 triethylphosphate $SO_3$ complex diluted with 100 ml. of carbon tetrachloride. The temperature is kept between 25°–35° C. by regulating the rate of addition. From the reaction mixture there is obtained upon neutralization sodium cyclohexyl sulfonate.

EXAMPLE 7

A sulfonic acid is produced as in Example 4 except for the following differences: Into the flask is placed 34.3 grams (0.1 mole) of tri (p-ethylphenyl) aluminum diluted with 100 ml. of dichloroethane. Into the dropping funnel are placed 78.6 grams (0.3 mole) of a 1:1 complex of triethyl phosphate and $SO_3$. From the reaction mixture there is obtained after neutralization sodium p-ethylbenzene sulfonate.

EXAMPLE 8

A sulfonic acid is produced as in Example 4 except for the following differences: About 27.8 grams (0.1 mole) of di-α-naphthyl-magnesium is reacted with 33.6 (0.2 mole) of a dioxane/$SO_3$ complex. There is obtained from the reaction mixture after neutralization sodium-α-naphthyl sulfonate.

EXAMPLE 9

A sulfonic acid is produced as in Example 4 except for the following differences: Into a flask is placed 8.4 grams (0.1 mole) of phenyl lithium. To this is added 15 grams (0.1 mole) of an $SO_3$/pyridine complex. The reaction mixture is stirred for 1 hour after complete addition. After neutralization there is obtained from the reaction mixture sodium phenyl sulfonate.

EXAMPLE 10

A sulfonic acid is produced as in Example 4 except for the following differences: Into a flask are placed 53.1 grams (0.1 mole) of an aluminum alkyl growth product corresponding to $Al[(CH_2)_{11}CH_3]_3$ diluted to 200 ml. with N,N'dimethyl formamide. To this is added 24 grams (0.3 mole) of $SO_3$ with 50 ml. of N,N'dimethyl formamide. After neutralization there is obtained from the reaction mixture an alkyl sodium sulfonate corresponding to $(C_{12}H_{25})SO_3Na$.

EXAMPLE 11

To 18.3 grams (0.1 mole) of triethyl phosphate dissolved in 250 cc. of dichloroethane is slowly added 8.0 grams (0.1 mole) of $SO_3$. The solution is stirred during the addition and the temperature rises from 25° to 37° C. The solvent is removed by heating to 35° C. at 5 mm. pressure. A 1:1 $SO_3$-triethyl phosphate complex is recovered.

EXAMPLE 12

To 6.1 grams (0.033 mole) of triethyl phosphate dissolved in 250 cc. of dichloroethane is slowly added 8.0 grams (0.1 mole) of $SO_3$. The solution is stirred and the temperature rises from 25° C. to 34° C. A 3:1 $SO_3$-triethyl phosphate complex is recovered.

EXAMPLE 13

To 8.8 grams (0.1 mole) of dioxane dissolved in carbon tetrachloride is slowly added 8.0 grams (0.1 mole) of $SO_3$ at −5° C. A white solid separates which can be stored as such or redissolved in carbon tetrachloride at room temperatures. A 1:1 $SO_3$-dioxane complex is thus prepared. A 2:1 $SO_3$-dioxane complex is prepared in the same manner by adding 8.0 grams (0.1 mole) of $SO_3$ to 4.4 grams (0.05 mole) of dioxane.

EXAMPLE 14

To 7.9 grams (0.1 mole) of pyridine dissolved in propylene dichloride is slowly added 8.0 grams of $SO_3$ to form a 1:1 $SO_3$-pyridine complex. Heat evolved in the addition may be controlled by the rate of $SO_3$ addition.

All percentages expressed herein unless otherwise designated are to be construed as percentage by weight.

The term "inert" as used herein refers to a substance that is essentially chemically inert to the reactants, intermediates and products of the reaction of an organometallic compound with an $SO_3$-organic complex such as hereinbefore described under the conditions of reaction herein set forth.

What is claimed is:

1. A process for producing $C_2$ to $C_{30}$ sulfonic acids which comprises contacting an aluminum compound selected from the group consisting of aluminum trialkyls having 2–30 carbon atoms per alkyl group and tri(arylalkyl) aluminums having 7–30 carbon atoms per arylalkyl group with a complex of $SO_3$ and a trialkyl phosphate wherein each alkyl group contains 1 to 18 carbon atoms in an inert diluent selected from the group consisting of liquid hydrocarbons and chlorinated hydrocarbons at a temperature in the range of about −100 to +100° C.

2. A process in accordance with claim 1 wherein said temperature is in the range of about 20° to 50° C.

3. A process in accordance with claim 1 wherein the mole ratio of $SO_3$ to said trialkyl phosphate in said complex is in the range of about 1:1 to 3:1.

4. A process in accordance with claim 1 wherein said aluminum compound is an aluminum trialkyl.

5. A process in accordance with claim 1 wherein said trialkyl phosphate is triethyl phosphate.

6. A process in accordance with claim 1 wherein said inert diluent is a chlorine substituted hydrocarbon.

7. A process in accordance with claim 1 wherein said diluent is 1,2-dichloroethane.

References Cited in the file of this patent

UNITED STATES PATENTS

| 2,268,443 | Crowder | Dec. 30, 1941 |
| 2,807,642 | Bloch et al. | Sept. 24, 1957 |
| 3,072,618 | Turbak | Jan. 8, 1963 |

OTHER REFERENCES

Turbak: Chem. and Eng. News, vol. 41, Mar. 18, 1963, page 43.

Groggins, op. cit., pages 326–328.

Rochow et al.: The Chemistry of Organometallic Compounds (1957), pages 279–280.

Groggins: Unit Processes in Organic Synthesis, 5th edition (1958), pages 306, 348–350.